United States Patent [19]
Ganse et al.

[11] Patent Number: 5,448,151
[45] Date of Patent: Sep. 5, 1995

[54] BATTERY CHARGER

[75] Inventors: Keizo Ganse, Youkaichi; Masahiko Adachi, Echi; Takeshi Tsuchiya, Hikone, all of Japan

[73] Assignee: Matsushita Electric Works, Ltd., Osaka, Japan

[21] Appl. No.: 170,727

[22] Filed: Dec. 21, 1993

[30] Foreign Application Priority Data

Dec. 22, 1992 [JP] Japan .................................. 4-342208

[51] Int. Cl.⁶ .......................................... H01M 10/46
[52] U.S. Cl. ...................................................... 320/2
[58] Field of Search ...................... 320/2; 439/283, 696

[56] References Cited

U.S. PATENT DOCUMENTS

| | | | |
|---|---|---|---|
| 3,665,285 | 5/1972 | Mullersman et al. | 320/2 |
| 3,783,364 | 1/1974 | Gallanis et al. | 320/2 |
| 4,288,733 | 9/1981 | Bilanceri et al. | 320/2 |
| 4,675,997 | 6/1987 | Nakagawa et al. | |

Primary Examiner—Thomas M. Dougherty
Assistant Examiner—E. Tso
Attorney, Agent, or Firm—Stevens, Davis, Miller & Mosher

[57] ABSTRACT

In a battery charger for an electric appliance powered by an incorporated rechargeable battery such as an electric shaver or electric toothbrush, etc., a charger circuit and charging terminals are incorporated in a casing. The charger circuit supplies a charger current to the rechargeable battery through the charging terminals. The interior of the casing is divided into lower circuit compartment for receiving the charger circuit and an upper terminal compartment by a partition carrying the charging terminals in such a manner as to make a water-tight seal between the circuit and terminal compartments. The charging terminals project into the terminal compartment, are electrically connected to the charger circuit, and also are accessible through individual holes formed in a portion of the casing for connection with the rechargeable battery. Therefore, even if the battery charger is used under a wet conditions, and water flows into the terminal compartment through the holes, water intrusion into the circuit compartment from the terminal compartment is stopped by the water-tight seal.

13 Claims, 14 Drawing Sheets

BATTERY CHARGER

BACKGROUND OF THE INVENTION

1. Field of the Invention

The present invention is directed to a battery charger for an electric appliance powered by an incorporated rechargeable battery such as an electric shaver or electric toothbrush, etc., and in particular to a water-resistant battery charger for charging the rechargeable battery of the electric appliance under a wet conditions.

2. Description of the Prior Art

In the past, since a water-resistant electric appliance powered by an incorporated rechargeable battery such as an electric shaver or electric toothbrush, etc., is often charged under wet conditions by a battery charger, the battery charger is also required to have water-resistant properties for safe charging operation under wet conditions. For example, a proposed battery charger 1F is illustrated in FIG. 20. The battery charger 1F comprises a casing 10F having a bottom opening 11F adopted to incorporate a charger circuit (not shown) therein, a bottom cover 50F for covering the bottom opening 11F, and a top cover 100F having horizontal and vertical portions 101F and 102F for hiding charging terminals 40F and lead wires 90F extending from the charger circuit to the charging terminals 40F along an outer surface of the casing 10F. After the charger circuit is incorporated in the casing 10F, and an electrically insulating resin is poured into the casing 10F, the bottom opening 11F is covered with the bottom cover 50F. The top cover 100F also has a connector 103F projecting from the horizontal portion 101F for engaging to a recess formed in the electric appliance. When the connector 103F of the battery charger 1F is inserted into the recess, charging terminal pins of the electric appliance disposed in the recess are connected with the charging terminals 40F through terminal holes 104F formed in the connector 103F, so that a charge current is supplied to the rechargeable battery of the electrical appliance.

Therefore, the battery charger 1F of the prior art is characterized by a complex structure including the charger circuit incorporated in the casing 10F, the charging terminals 40F and lead wires 90F exposed on the exterior surface of the casing 10F, and the top cover 100F for hiding and protecting the terminals 40F and lead wires 90F between the top cover 100F and the casing 10F. Such a complex structure would create difficulties in fabricating a small-sized battery charger and thus expensive production cost.

SUMMARY OF THE INVENTION

The present invention is related to a water-resistant battery charger for an electric appliance powered by an incorporated rechargeable battery such as an electric shaver or electric toothbrush, etc. In the battery charger, a charger circuit and charging terminals are incorporated in a casing. The charger circuit supplies a charger current to the rechargeable battery through the charging terminals. The interior of the casing is divided into a circuit compartment for receiving the charger circuit and a terminal compartment by a partition carrying the charging terminals in such a manner as to make a water-tight seal between the circuit and terminal compartments. The charging terminals project into the terminal compartment, are electrically connected to the charger circuit, and also are accessible through individual holes formed in a portion of the casing for connection with the rechargeable battery. Therefore, it is possible to make the water-resistant battery charger as a whole smaller by incorporating the charging terminals and charger circuit in the casing, while providing such a water-tight seal between the terminal and circuit compartments.

Therefore, it is a primary object of the present invention to provide a water-resistant battery charger for an electric appliance powered by an incorporated rechargeable battery, in which a circuit compartment for receiving a charger circuit and a terminal compartment are formed in a casing of the battery charger in such a manner as to make a water-tight seal between the circuit and terminal compartments.

In a preferred embodiment of the present invention, the partition is formed with at least one annular projection which is engaged into a corresponding annular groove formed in an interior surface of the casing. Of course, it is possible that the partition is formed with at least one annular groove which is engaged to a corresponding annular projection formed on the interior surface of the casing. When the circuit and terminal compartments are divided in the casing by such a partition, an improved water-tight seal is obtained between the terminal and circuit compartments.

It is further preferred that each of the charging terminals is integrally molded into the partition made of an electrically insulating plastic material with a lower end of the charging terminal. When the circuit and terminal compartments are divided in the casing by thus molded partition, the charging terminal can be electrically connected with the charger circuit without permitting a water intrusion into the circuit compartment.

It is another preferred that an insulating resin or a mixture of insulating resin and particles is further poured into the circuit compartment to enhance a heat sink efficiency of the charger circuit within the casing.

It is still another preferred that each of the terminals is in the form of a tubular pin which is shaped from a blank metal sheet and which has a lead portion projecting from the partition.

It is also preferred that the casing is opened to define a bottom opening of the circuit compartment through which the partition and a circuit board mounting electrical components of the charger circuit are assembled into the casing, and also the bottom opening is closed by a bottom cover in a water-tight manner. An elastic seal material is attached to the peripheral edge of the bottom cover for improving the water-tight manner between the circuit compartment and the exterior of the casing.

For more complete understanding of the present invention and its construction and advantages, reference should be made to the following description and to the attached drawings.

DETAILED DESCRIPTION OF PREFERRED EMBODIMENTS

Figure 1:
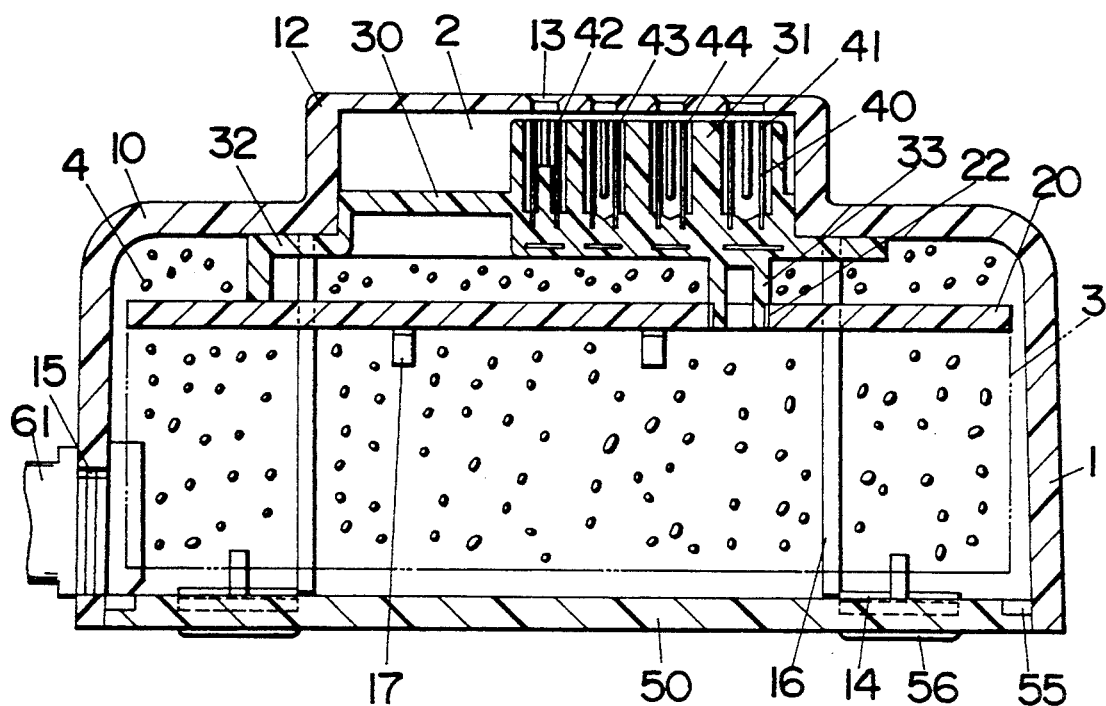
FIG. 1 is a longitudinal sectional view of a battery charger of the present invention.
Figure 2:
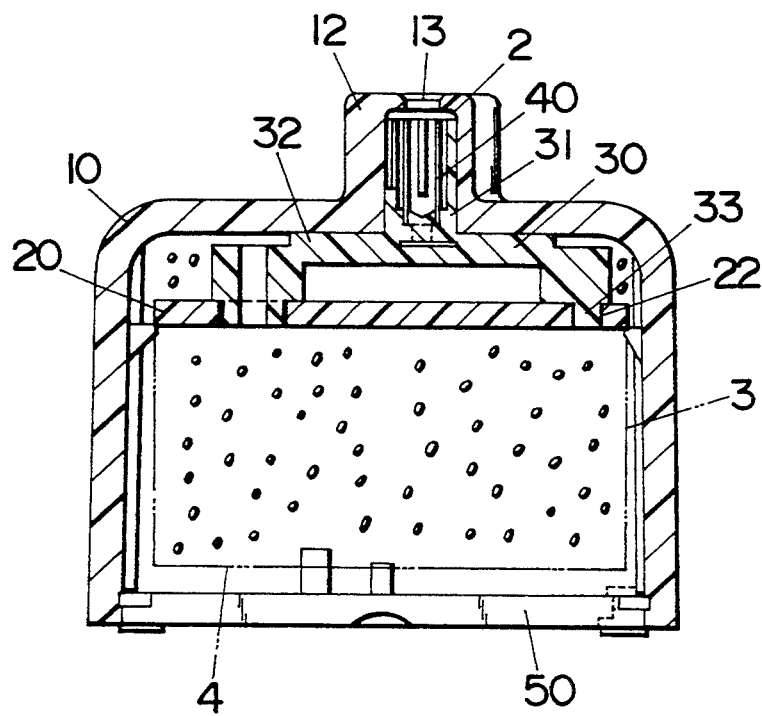
FIG. 2 is a transverse sectional view of the battery charger.
Figure 3:
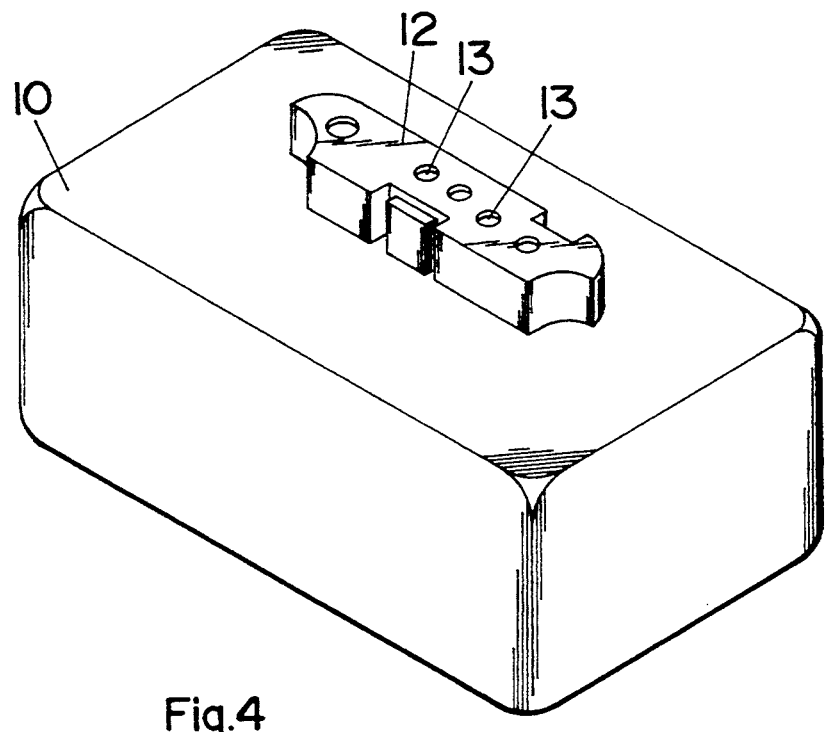
FIG. 3 is a perspective view showing a casing of the battery charger.
Figure 4:
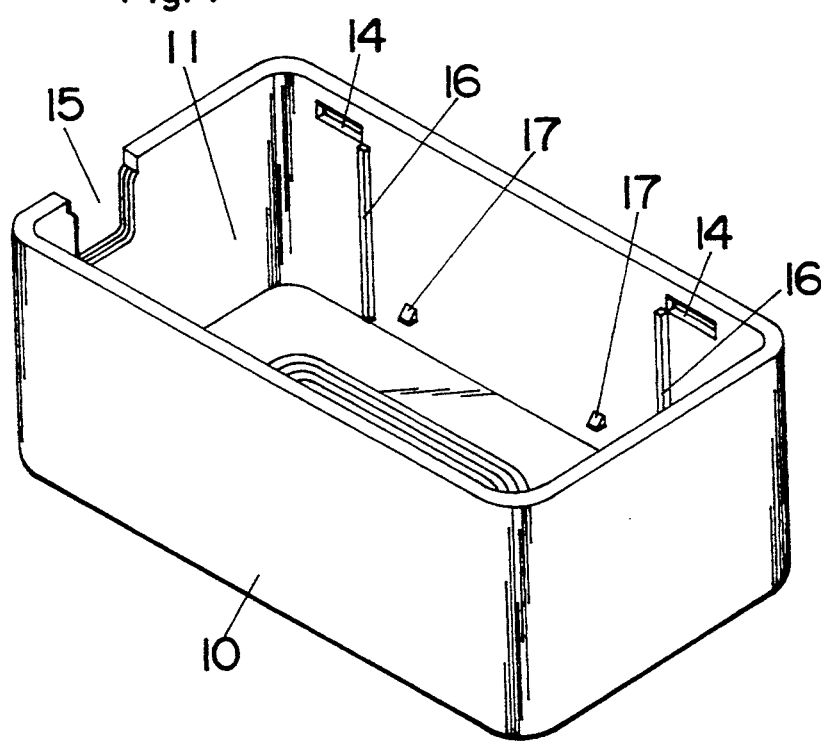
FIG. 4 is a perspective view showing a bottom opening of the casing.

Referring to FIGS. 1 to 5, a water-resistant battery charger 1 for an electric shaver powered by an incorporated rechargeable battery comprises a casing 10 having a bottom opening 11, a circuit board 20 mounting electrical components of a charger circuit 21 thereon, a partition 30 having a terminal supporting portion 31 for supporting a plurality of terminals 40, and a bottom cover 50 for covering the bottom opening 11. In the battery charger 1 of this embodiment, the terminals 40 substantially consist of positive and negative terminals 41 and 42 for supplying a charger current from the charger circuit 21 to the rechargeable battery of the electric shaver, a first terminal 43 for providing a charging stop signal to the battery charger 1 when a charging of the rechargeable battery is finished, and a second terminal 44 for providing a charging start signal to the electric shaver. The casing 10 further includes a projection 12 defining inside thereof a terminal compartment 2 for incorporating the terminal supporting portion 31, as shown in FIG. 3. The projection 12 is formed in such a shape as to fit into a recess of the electrical shaver adopted to charge the rechargeable battery. The projection 12 also has a plurality of terminal holes 13 through which the terminals 40 are connected with terminal pins (not shown) projecting in the recess of the electric shaver. In an interior surface of the casing 10, there are concave portions 14 for engaging with hooks 51 of the bottom cover 50, a power cord exit 15, ribs 16 and umbos 17 for guiding or fixing the cover 50 and the partition 30, respectively, to their predetermined positions within the casing 10. The partition 30 further includes an annular flange portion 32 extending around the terminal supporting portion 31, and a plurality of bosses 33 for engaging with apertures 22 formed in the circuit board 20. After the partition 30 is fixed with the circuit board 20 by inserting the bosses 33 into the apertures 22, an assembly of the partition 30 and the circuit board 20 is incorporated in the casing 10 such that the flange portion 32 of the partition 30 is contacted with an interior surface of the casing 10 to thereby form a water-tight seal between the terminal compartment 2 and a circuit compartment 3 for receiving the circuit board 20 within the casing. In addition, the partition 30 is made of an electrically insulating material and integrally molded with the terminals 40 and lead members (not shown) through which the terminals 40 are electrically connected with the charger circuit 21 so as to prevent a water intrusion into the circuit compartment 3 from the terminal compartment 2.

Figure 5:
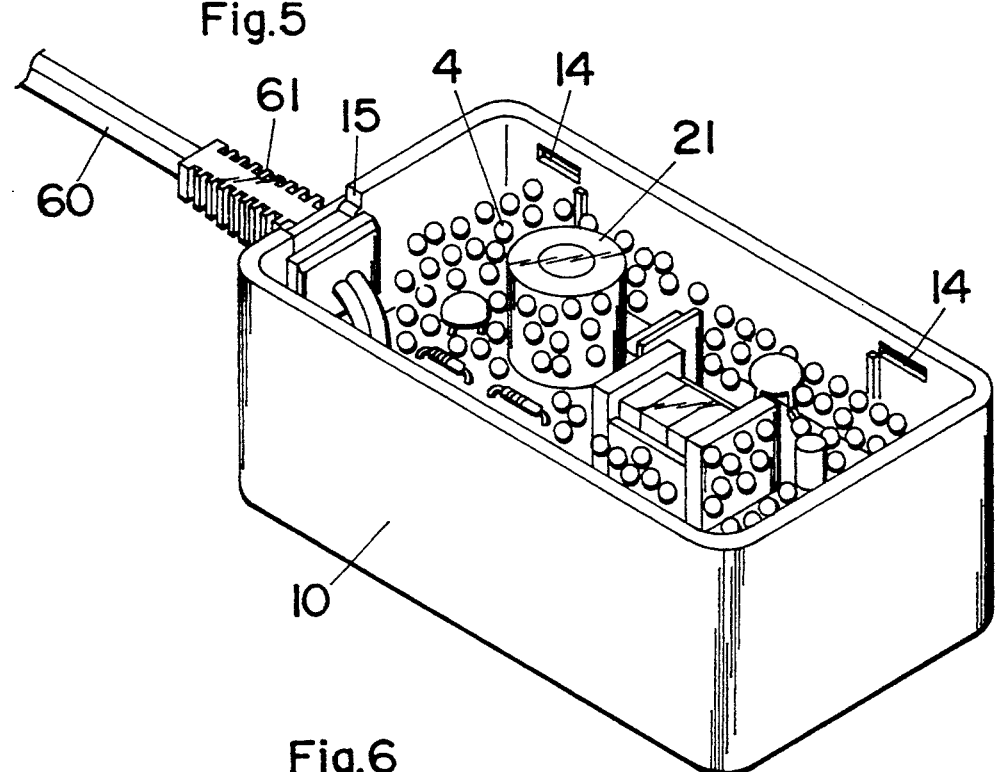
FIG. 5 is a perspective view showing the bottom opening of the casing in which a charger circuit and an electrically insulating material are incorporated.

After the assembly of the partition 30 and the circuit board 20 are incorporated in the casing 10, a power cord 60 is connected with the charger circuit 21, and a code bushing 61 of the power cord 60 is fixed to the power cord exit 17 of the casing 10. Subsequently, a potting agent 4, for example, an insulating resin or a mixture of electrically insulating particles having high thermal conductivity such as aluminum oxide and the insulating resin, is poured into the circuit compartment 3 for preventing an overheat of the charger circuit 21 during a charging of the rechargeable battery, as shown in FIG. 5. That is, heat generated in the electrical components of the charger circuit 21 during the charging can be efficiently removed to the outside of the casing 10 through the potting agent 4. Of course, it is possible that after the insulating particles are put in the circuit compartment 3, the insulating resin is impregnated into spaces between the insulating particles. However, in case of impregnating the insulating resin having a high viscosity into the spaces between the insulating particles, there is a possibility that a gas remaining in the spaces is expanded by the heat generated during the charging, so that a pressure of the expanded air has an undesirable influence on the electrical properties of the charger circuit 21. Therefore, in such a case, it is preferred that after the insulating resin and particles are sufficiently mixed, the resulting mixture is poured into the circuit compartment 3. Additionally, it is possible that the circuit compartment 3 is filled with an insulating particle layer and an insulating resin layer. By the way, since the circuit compartment 3 is isolated from the terminal compartment 2 by the water-tight seal, even if the mixture of the insulating resin and particles is poured into the circuit compartment 3, the mixture does not intrude into the terminal compartment 2 from the circuit compartment 3. Of course, even if the battery charger 1 is used in wet conditions, and water flows into the terminal compartment 2 through the terminal holes 15, water does not intrude into the circuit compartment 3 from the terminal compartment 2.

Figure 6:
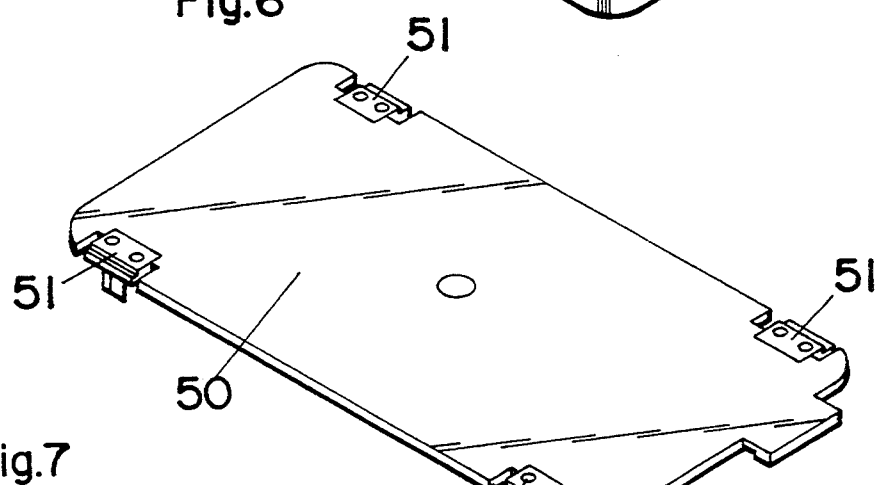
FIG. 6 is a perspective view showing a bottom cover for covering the bottom opening.
Figure 7:
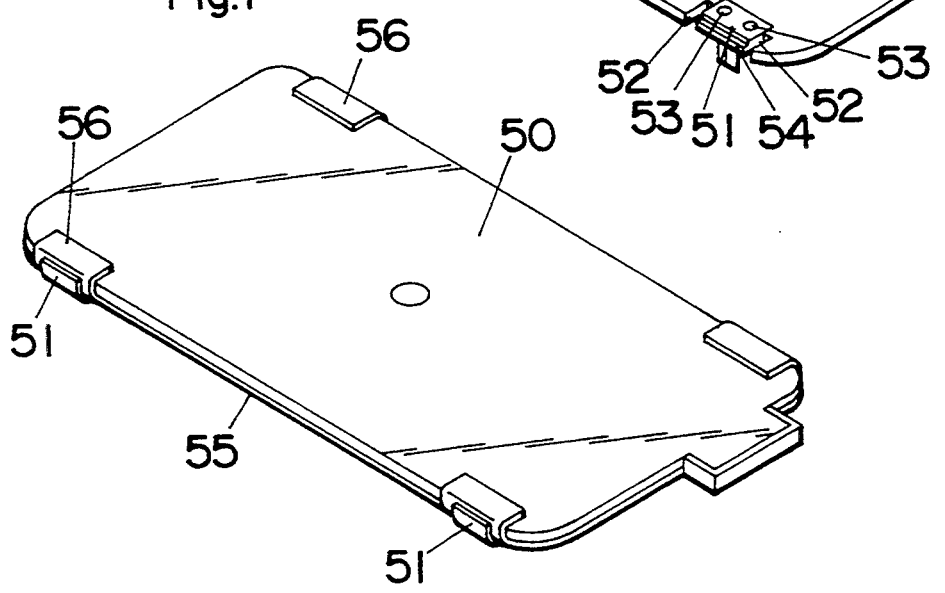
FIG. 7 is a perspective view showing the bottom cover having an elastic seal attached to the peripheral edge thereof.

After the circuit compartment 3 is filled with the potting agent 4, the bottom opening 11 is covered with the bottom cover 50. As shown in FIG. 6, the bottom cover 50 comprises the hooks 51, a pair of notches 52 formed at both sides of each hook 51, through holes 53 formed at the root of each hook, and a guide wall 54 formed at a portion adjacent to each hook 51. A thickness of the edge of each hook 51 is about one half of the thickness of the bottom cover 55. In addition, as shown in FIG. 7, an elastic seal 55 made of an elastic material such as a rubber is attached to the peripheral edge of the bottom cover 50 except for the edge of each hook 51 such that a thickness of the elastic seal 55 is about one half of that of the bottom cover 50. The elastic seal 55 is also engaged with the notches 52 and through holes 53 of the bottom cover 50 to increase a bonding strength between the elastic seal 55 and the bottom cover 50. Therefore, the bottom opening 11 is covered with the bottom cover 50 by engaging the hooks 51 with the concave portions 14 of the casing 10 in such a manner as to form a water-cutoff seal between the circuit compartment 3 and the outside of the casing 10. The elastic seal 55 further includes non-slip strips 56 disposed on the bottom cover 50 adjacent to the hooks 51.

By the way, since the circuit compartment 3 is sealed with the elastic seal 55 of the bottom cover 50, as described above, even if the bottom opening 11 is covered with the bottom cover 50 before the insulating resin poured in the circuit compartment 3 is cured sufficiently, the insulating resin does not flow out from the circuit compartment 3 to the outside of the casing 10. Such a sealing of the insulating resin creates a preferable advantage that the battery charger 1 can be efficiently manufactured without waiting for the curing of the insulating resin, so that a production cost of the battery charger 1 would be sharply reduced.

Figure 8A:
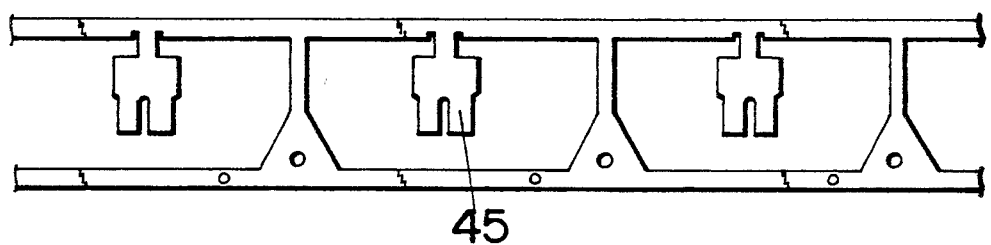
FIGS. 8A to 8D are plan views illustrating a process for manufacturing terminals of the battery charger of the present invention.
Figure 8B:
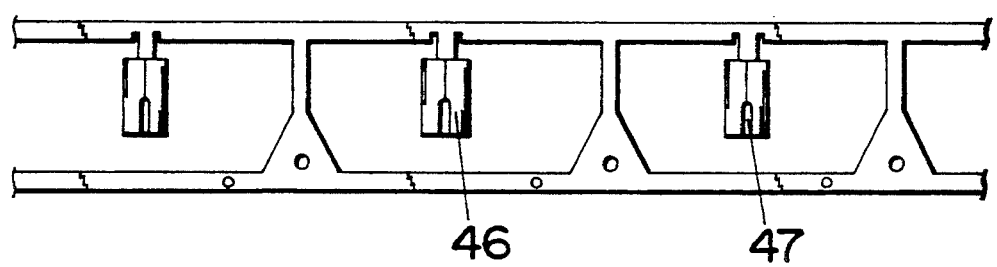
Figure 8C:
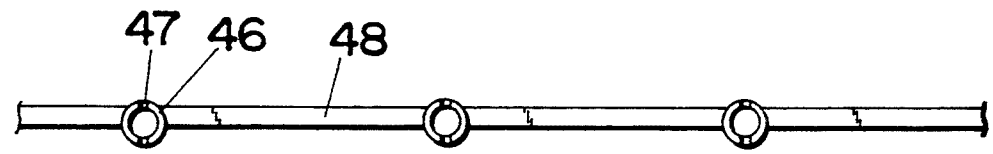
Figure 8D:
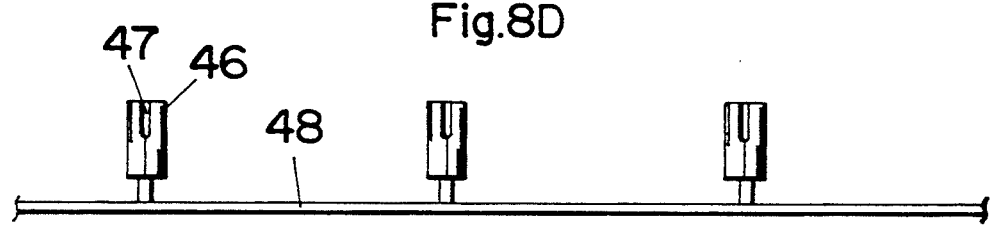
Figure 9A:
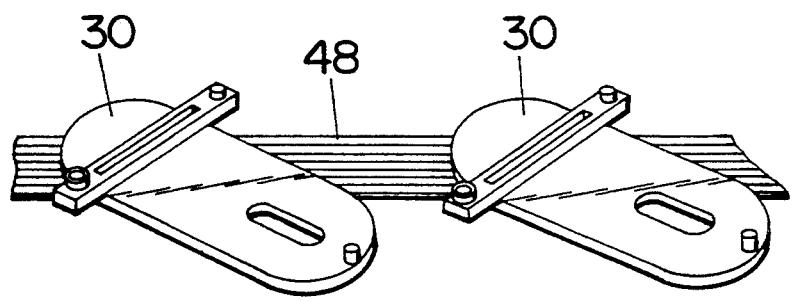
FIGS. 9A and 9B are perspective views illustrating a process for manufacturing a partition integrally molded with the terminals.
Figure 9B:
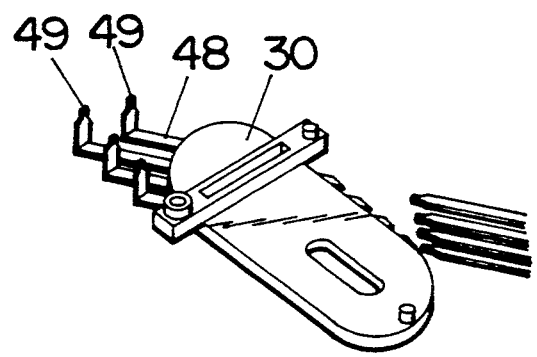
Figure 10:
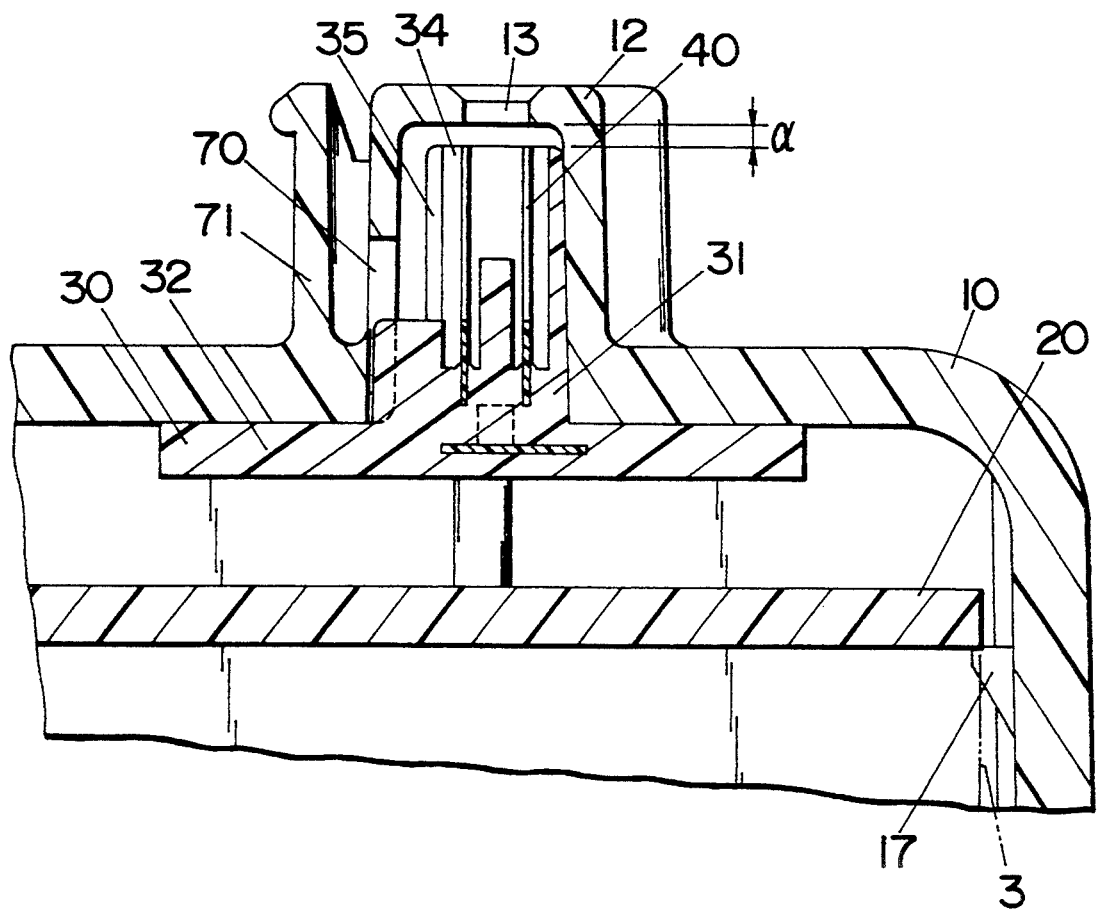
FIG. 10 is a fragmentary transverse sectional view of the battery charger of the present invention.

The terminals 40 are usually produced according to steps of die-cutting metal blanks from a metal sheet to thereby obtain a plurality of terminal strips 45 integrally formed with a metal frame, as shown in FIG. 8A, bending each terminal strip 45 in such a manner as to form a tubular portion 46 having terminal slits 47, as shown in FIG. 8B, and then cutting off the metal frame so as to remain a metal liner 48 connecting with the terminals 40, as shown in FIGS. 8C and 8D. A plurality of the formed metal liners 48, each of which has the terminals 40, are integrally molded with a plurality of the partitions 30 such that a required number of the terminals 40 are mounted to each partition 30, as shown in FIG. 9A. Subsequently, the metal liners 48 are cut, as shown in FIG. 9B, to obtain the individual partition 30 having the required number of the terminals 40. One end portion 49 of each metal liner 48 of the partition 30 is used for forming an electrical connection between the terminal 40 and charger circuit 21. The tubular portions 46 of each terminal 40 are incorporated in a cylinder 34 having a slit 35 formed in the terminal supporting portion 31. The cylinder 34 is formed with a larger diameter than the tubular portion 46 for allowing to increase the diameter of the tubular portion 46 when the terminal pin of the electric shaver is inserted into the tubular portion 46. When the partition 30 is incorporated in the projection 12, as shown in FIG. 10, a clearance $a$ is provided between an interior top surface of the projection 12 and a top surface of the terminal supporting portion 31 for preventing a short circuit between adjacent terminals 40 which is caused by water accidentally intruded into the terminal compartment 2 through the terminal holes 13.

In addition, water accidentally intruded into the tubular portion 46 of the terminal 40 is effectively removed to the outside of the casing 10 through the terminal slit 47, the slit 35 of cylinder 34, and also a water discharge port 70 formed in a sidewall of the projection 12. Numeral 71 designates a barrier formed in front of the water discharge port 70 for preventing a water intrusion into the terminal compartment 2 through the discharge port 70.

Figure 11:
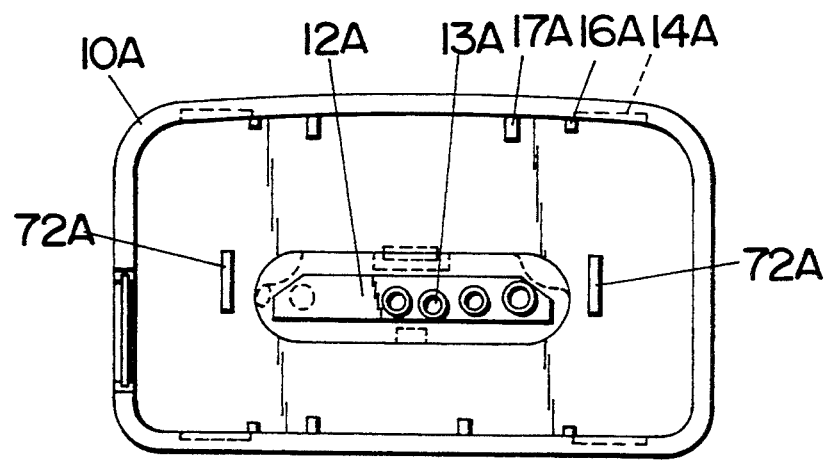
FIG. 11 is a bottom plan view of a casing of a battery charger of the present invention.
Figure 12:
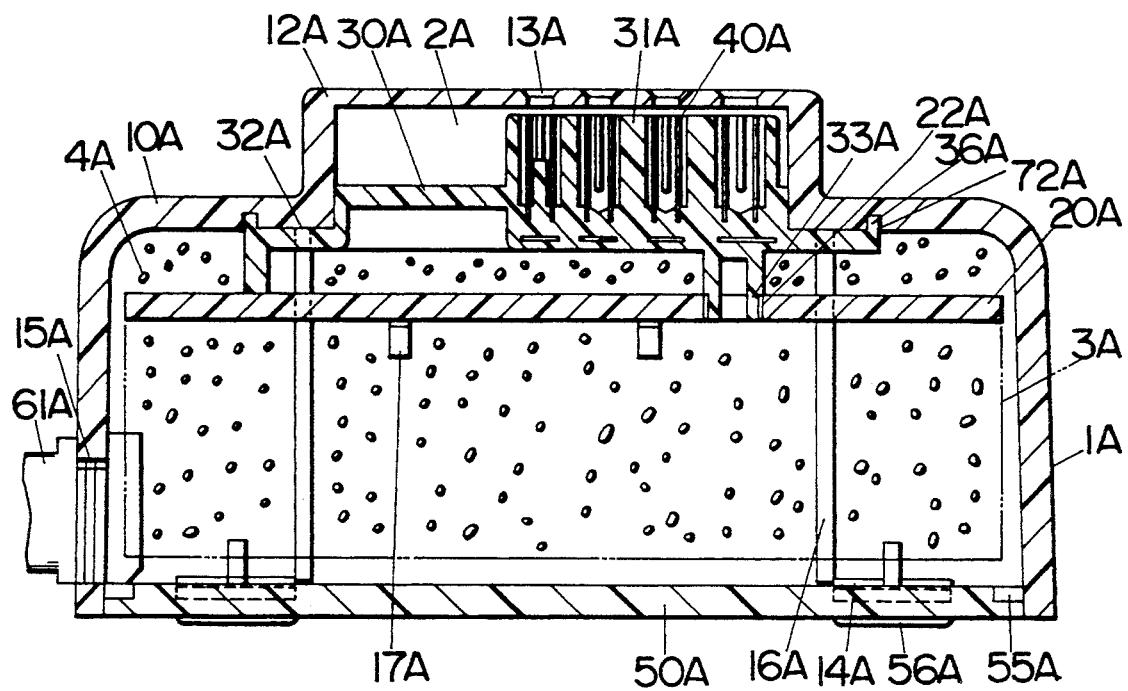
FIG. 12 is a longitudinal sectional view of the battery charger using the casing of FIG. 11.

Each of the below explained battery chargers of the present invention is substantially identical in structure to the above embodiment except for the following features. Therefore no duplicate explanation to common parts and operation are deemed necessary. As shown in FIGS. 11 and 12, a pair of slots 72A is formed in an interior surface of the casing 10A of a battery charger 1A. On the other hand, a pair of salient portions 36A is formed on a flange portion 32A of a partition 30A in such a position as to engage to the slots 72A when the partition 30A is incorporated in the casing 10A. In addition, such an engagement of the salient portions 36A with the slots 72A is useful as a guider for positioning terminal 40A just under terminal holes 13A of a projection 12A of the casing 10A.

Figure 13A:
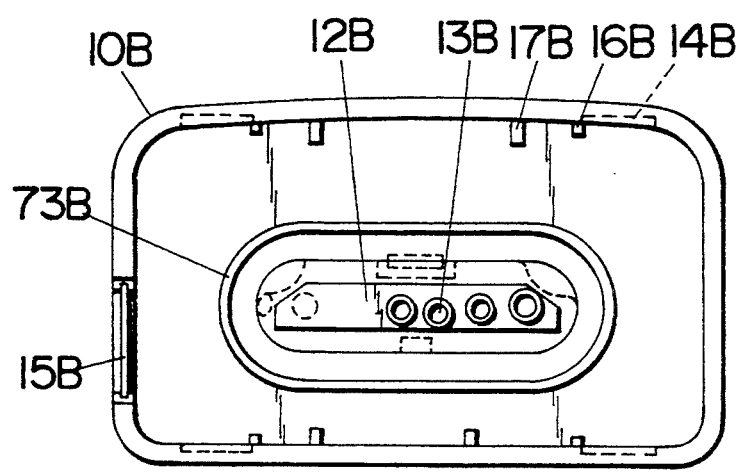
FIGS. 13A and 13B show a bottom plan view of a casing having an annular groove and a top plan view of a partition having an annular projection which is adopted to engage to the annular groove, respectively.
Figure 13B:
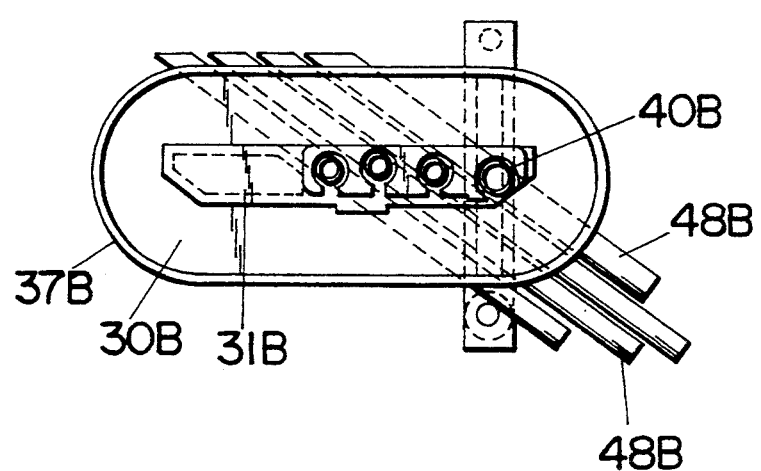
Figure 14:
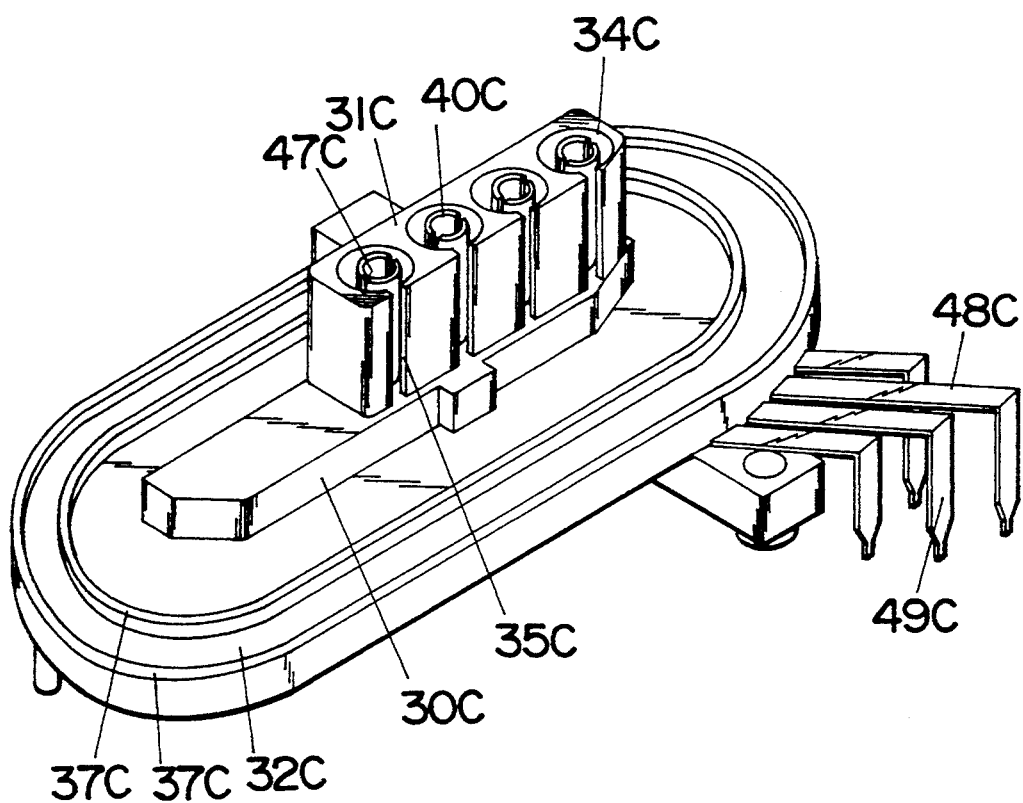
FIG. 14 is a perspective view of a partition having two annular projections used in a battery charger of the present invention.
Figure 15:
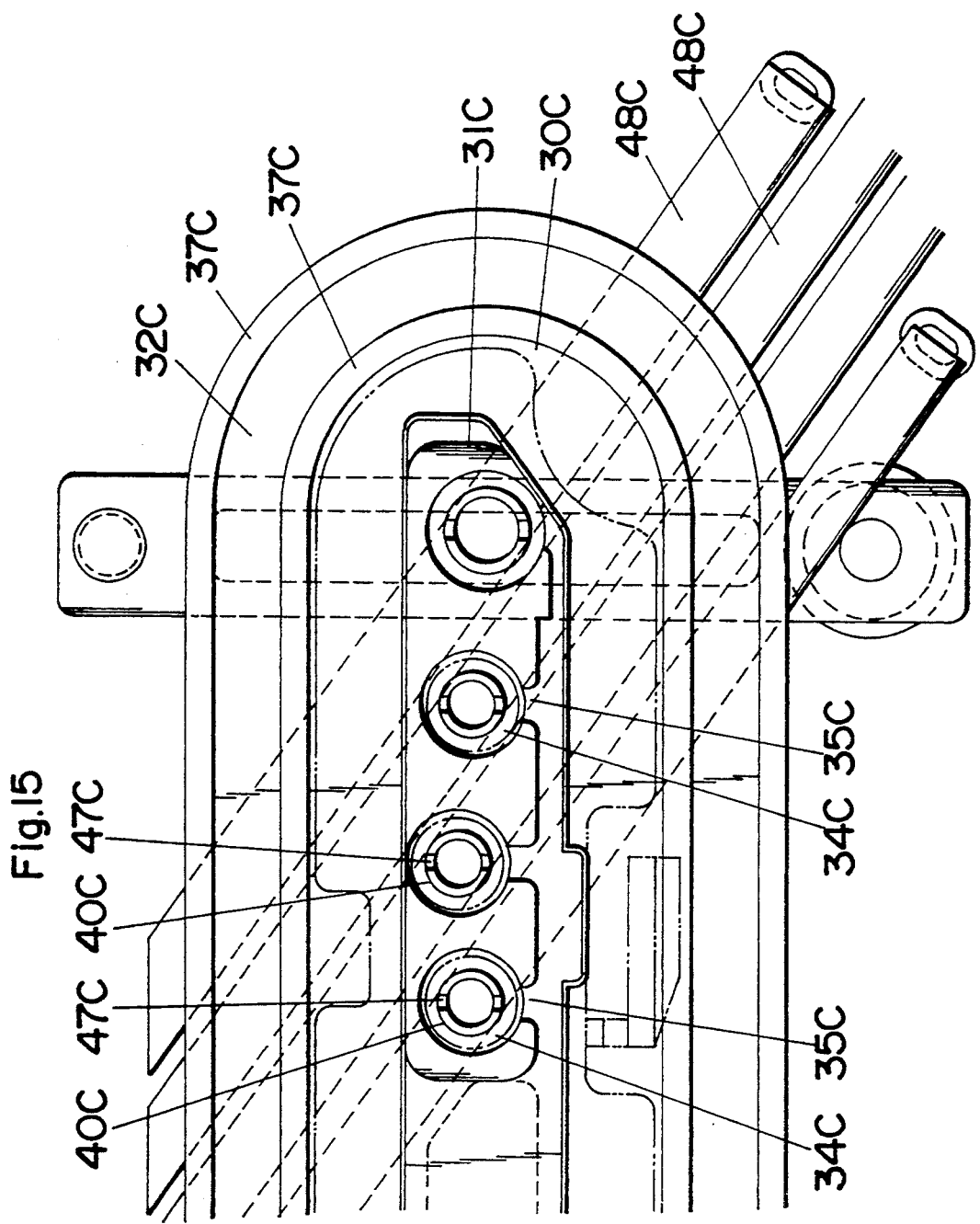
FIG. 15 is a fragmentary top plan view of the partition of FIG. 14.
Figure 16:
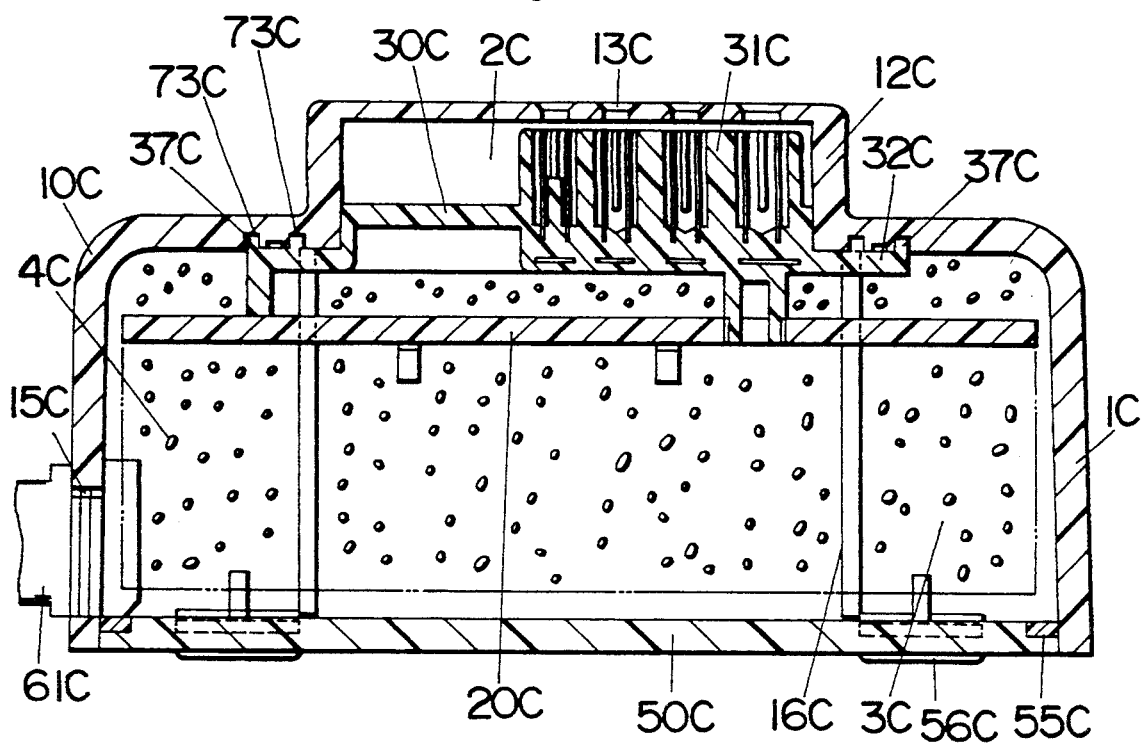
FIG. 16 is a longitudinal sectional view of a battery charger using the partition of FIG. 14.
Figure 17:
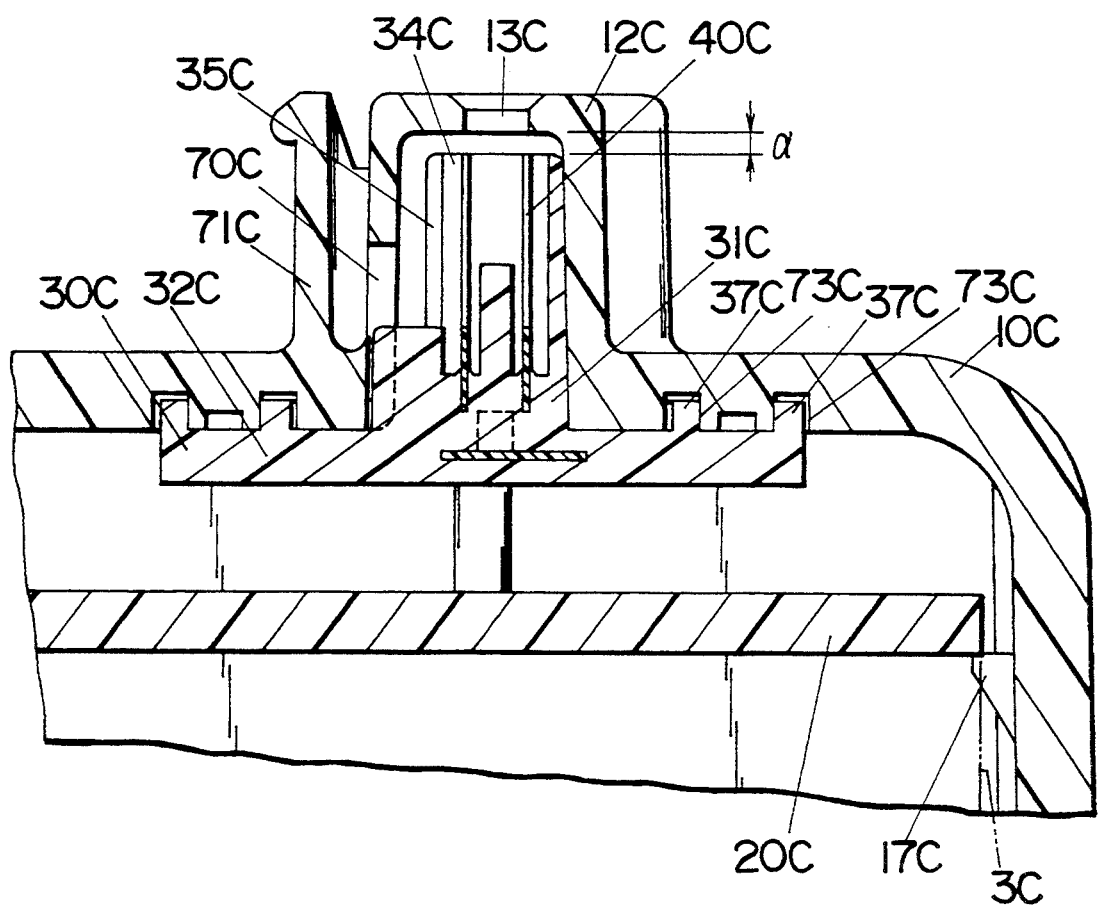
FIG. 17 is a fragmentary transverse sectional view of the battery charger of FIG. 14.

As shown in FIGS. 13A and 13B, at least one annular projection 37B is formed on a flange portion 32B of a partition 30B. On the other hand, an annular groove 73B is formed in an interior surface of a casing 10B so as to engage into a corresponding annular projection 37B when the partition 30B is incorporated in the casing 10B. Of course, it is possible that the partition is formed with an annular groove which is engaged into a corresponding annular projection formed on the interior surface of the casing. Therefore, since the partition 30B is fixed inside the casing 10B by engaging the annular groove 73B with the annular projection 37B, an improved water-tight seal is obtained between circuit and terminal compartments (not shown) within the casing 10B. In particularly, as shown in FIGS. 14 to 17, it is preferred that a partition 30C has two annular projections 37C for engaging into two annular grooves 73C formed in an interior surface of a casing 10C to obtain the improved water-tight seal.

Figure 18A:
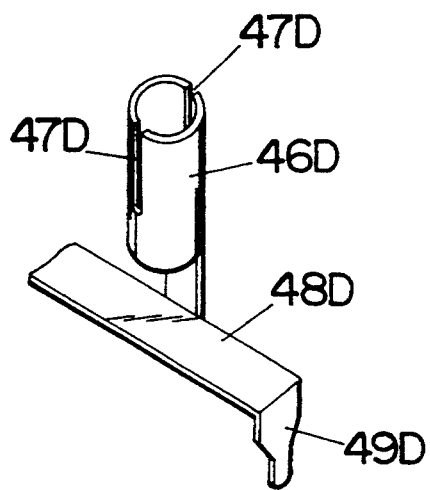
FIGS. 18A and 18B illustrate a perspective view of a terminal having two slits and a fragmentary perspective view showing the terminal of FIG. 18A which is integrally molded with a partition, respectively.
Figure 18B:
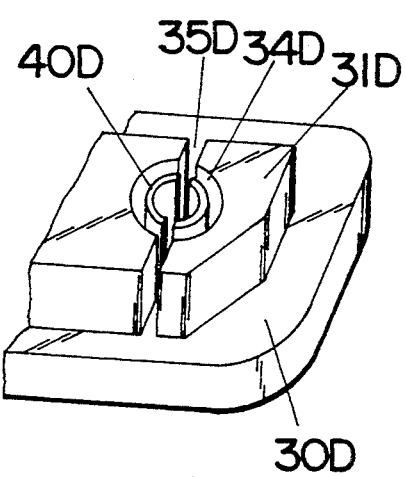
Figure 19A:
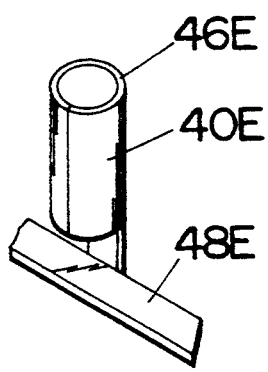
FIGS. 19A and 19B illustrate a perspective view of a terminal without slits and a fragmentary perspective view showing the terminal of FIG. 19A which is integrally molded with a partition, respectively.
Figure 19B:
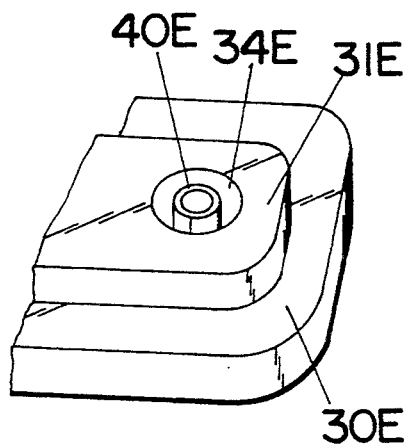
Figure 20:
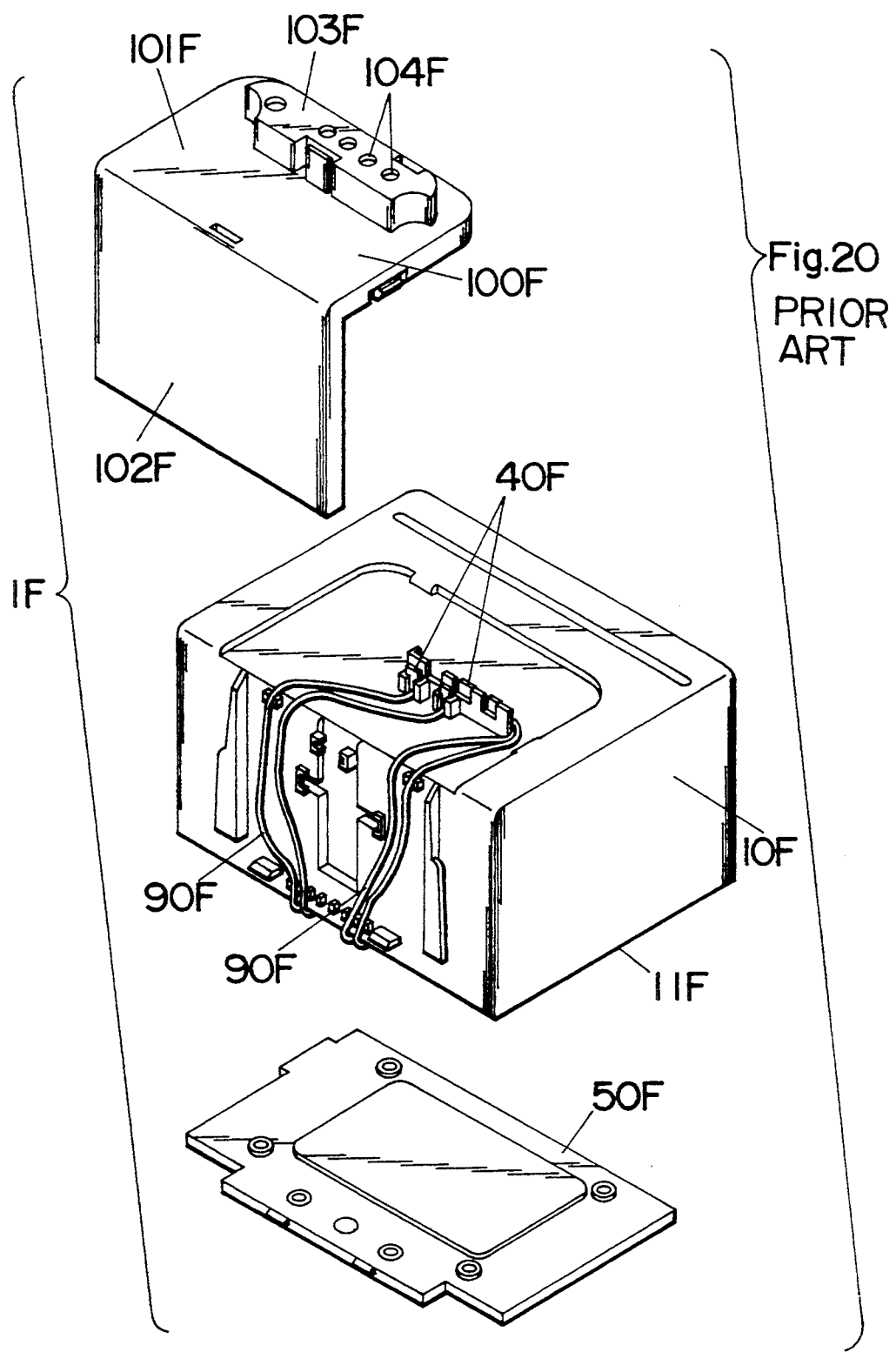
FIG. 20 is an exploded perspective view of a battery charger of the prior art.

As shown in FIGS. 18A and 18B, it is preferred that two terminal slits 47D are formed in a tubular portion 46D of each terminal 40D, and two slits 35D are formed in each cylinder 34D of a terminal supporting portion 31D of a partition 30D for efficiently removing water accidentally intruded into the tubular portion 46D. Of course, as shown in FIGS. 19A and 19B, it is possible that such terminal slits are not formed in a tubular portion 46E of each terminal 40E, and such slits are not formed in each cylinder 34E of a terminal supporting portion 31E of a partition 30E.

As described above, the water-resistant battery charger 1 of the present invention has the following advantages. That is, the battery charger 1 can be made as a whole smaller by incorporating the terminals 40 and charger circuit 21 in the casing 10, while forming a water-tight seal between the terminal compartment 2 and the circuit compartment 3 within the casing 10. In addition, the battery charger 1 can be made by a simple and efficient fabrication process.

What is claimed is;

1. A battery charger for an electric appliance powered by an incorporated rechargeable battery, said battery charger comprising:

a casing with a closed top accommodating charging terminals and a charger circuit for supplying a charging current to said rechargeable battery through said charging terminals, said casing having a top wall and a bottom opening a bottom cover for closing said bottom opening in a watertight manner;

a separately formed partition which is assembled through said bottom opening and into said casing so as to divide the interior of said casing into a lower circuit compartment and an upper terminal compartment in such a manner as to make a watertight seal between said terminal and circuit compartments, said circuit compartment receiving said charger circuit which is assembled through said bottom opening into said casing; and said partition carrying said terminals which are electrically connected to said charger circuit and project into said terminal compartment, said terminals being accessible through individual holes formed in a portion of said top wall for connection with said rechargeable battery, said terminals being integrally molded in said partition.

2. A battery charger as set forth in claim 1, wherein said partition having said terminals molded therein is made of an electrically insulating plastic material with said terminals being positioned with a lower end thereof projecting into said circuit compartment for electrical connection with said charger circuit.

3. A battery charger as set forth in claim 1, wherein said circuit compartment is further filled with an electrically insulating resin.

4. A battery charger as set forth in claim 1, wherein said circuit compartment is further filled with a mixture of electrically insulating resin and particles.

5. A battery charger as set forth in claim 2, wherein at least some of said terminals are in the form of a tubular pin which is shaped from a metal sheet blank and which has an extension lead projecting from said partition into said circuit compartment.

6. A battery charger as set forth in claim 1, wherein said casing has a projection which is adapted to be fitted into a recess formed in said electrical appliance, said projection defining inside thereof said terminal compartment.

7. A battery charger as set forth in claim 6, wherein said projection is formed with a discharge port through which said terminal compartment communicates with the exterior of the casing for escape of water accidentally intruded in said terminal compartment.

8. A battery charger as set forth in claim 1, wherein an integrally formed terminal block of said partition projects into said terminal compartment, said terminal block having opened top bores into which said terminals extend.

9. A battery charger as set forth in claim 8, wherein said terminal block is formed with slots respectively communicating with said bores.

10. A battery charger as set forth in claim 1, wherein said charger circuit comprising a circuit board mounting thereon electrical components of said charger circuit.

11. A battery charger as set forth in claim 1, wherein an elastic seal material is carried by the peripheral edge of the bottom cover for improving said closing in a water-tight manner.

12. A battery charger as set forth in claim 1, wherein said partition is formed on its periphery with at least one annular projection which is engaged into a corresponding annular groove formed in interior surface of said casing for improving said water-tight seal.

13. A battery charger as set forth in claim 1, wherein said partition is formed on its periphery with at least one annular groove which is engaged into a corresponding annular projection formed on interior surface of said casing for improving said water-tight seal.

* * * * *